United States Patent
Backman et al.

(10) Patent No.: US 7,596,110 B2
(45) Date of Patent: Sep. 29, 2009

(54) ROUTING IN VIRTUAL PRIVATE NETWORK

(75) Inventors: Jan Backman, Karna (SE); Krister Norlund, Gothenburg (SE); Anders Engstrom, Gothenburg (SE); Linus Magnusson, Gothenburg (SE); Johan Kopman, Hisings Backa (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 414 days.

(21) Appl. No.: 10/503,740

(22) PCT Filed: Feb. 27, 2003

(86) PCT No.: PCT/SE03/00326
§ 371 (c)(1),
(2), (4) Date: Feb. 7, 2005

(87) PCT Pub. No.: WO03/073707
PCT Pub. Date: Sep. 4, 2003

(65) Prior Publication Data
US 2005/0129001 A1     Jun. 16, 2005

(30) Foreign Application Priority Data
Feb. 28, 2002   (SE) ................................ 0200640

(51) Int. Cl.
*H04Q 7/00* (2006.01)
*H04Q 7/24* (2006.01)
*H04L 12/66* (2006.01)

(52) U.S. Cl. .................... 370/313; 370/338; 370/349; 370/352

(58) Field of Classification Search .................. None
See application file for complete search history.

(56) References Cited

U.S. PATENT DOCUMENTS
6,339,595 B1 *   1/2002   Rekhter et al. .............. 370/392

(Continued)

FOREIGN PATENT DOCUMENTS
EP        1071296 A1      7/1999

(Continued)

OTHER PUBLICATIONS
Swedish Patent Office, International Search Report for PCT/SE03/00326, dated Apr. 1, 2003.

*Primary Examiner*—Chi H. Pham
*Assistant Examiner*—Soon D. Hyun
(74) *Attorney, Agent, or Firm*—Roger S. Burleigh

(57) ABSTRACT

A router providing selective routing depending on traffic direction. The router includes two IP interfaces, where each IP interface is associated with a respective virtual private network. The router uses two forwarding tables. The first forwarding table routes traffic towards a first IP interface and a second forwarding table is capable of simultaneously routing traffic in the opposite direction, away from the first IP interface. The first IP interface is coupled to a first tunnel which provides bi-directional connectivity to mobile stations. The second IP interface is coupled to a second tunnel providing bi-directional connectivity to a corporate network. The router also includes a third interface which provides bi-directional connectivity to mobile stations. The router routes traffic through the second interface in the event that a mobile station on one interface is communicating with a mobile station on the third interface.

7 Claims, 8 Drawing Sheets

U.S. PATENT DOCUMENTS

| | | | |
|---|---|---|---|
| 6,778,498 B2 * | 8/2004 | McDysan | 370/231 |
| 6,792,484 B1 * | 9/2004 | Hook | 710/52 |
| 6,810,037 B1 * | 10/2004 | Kalapathy et al. | 370/392 |
| 6,891,797 B1 * | 5/2005 | Frouin | 370/230 |
| 7,106,740 B1 * | 9/2006 | Leelanivas et al. | 370/392 |
| 2002/0010758 A1 * | 1/2002 | Chan | 709/218 |
| 2002/0069278 A1 * | 6/2002 | Forslow | 709/225 |
| 2002/0181477 A1 | 12/2002 | Mo et al. | |
| 2003/0086422 A1 * | 5/2003 | Klinker et al. | 370/389 |
| 2004/0103205 A1 * | 5/2004 | Larson et al. | 709/229 |
| 2004/0202184 A1 * | 10/2004 | Yazaki et al. | 370/395.31 |
| 2005/0129001 A1 * | 6/2005 | Backman et al. | 370/352 |
| 2005/0265329 A1 * | 12/2005 | Havala et al. | 370/389 |

FOREIGN PATENT DOCUMENTS

| | | | |
|---|---|---|---|
| EP | 1071296 | * | 1/2001 |
| EP | 1071296 A1 | * | 1/2001 |

* cited by examiner

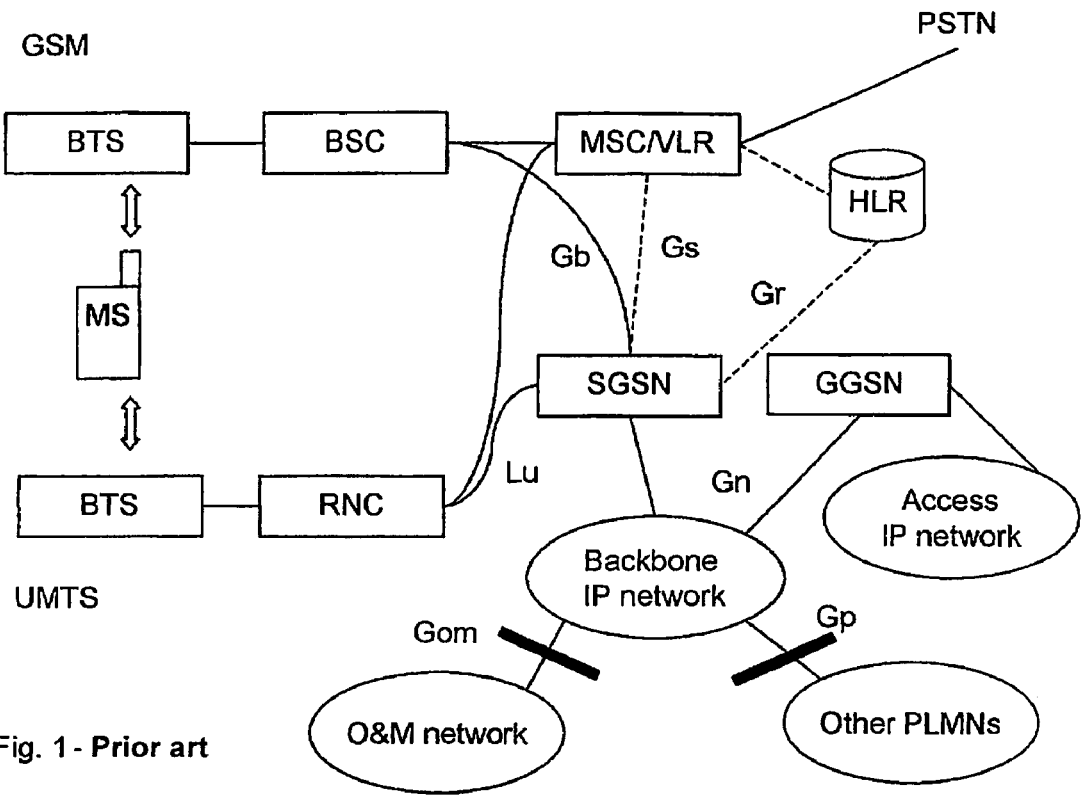
Fig. 1 - Prior art
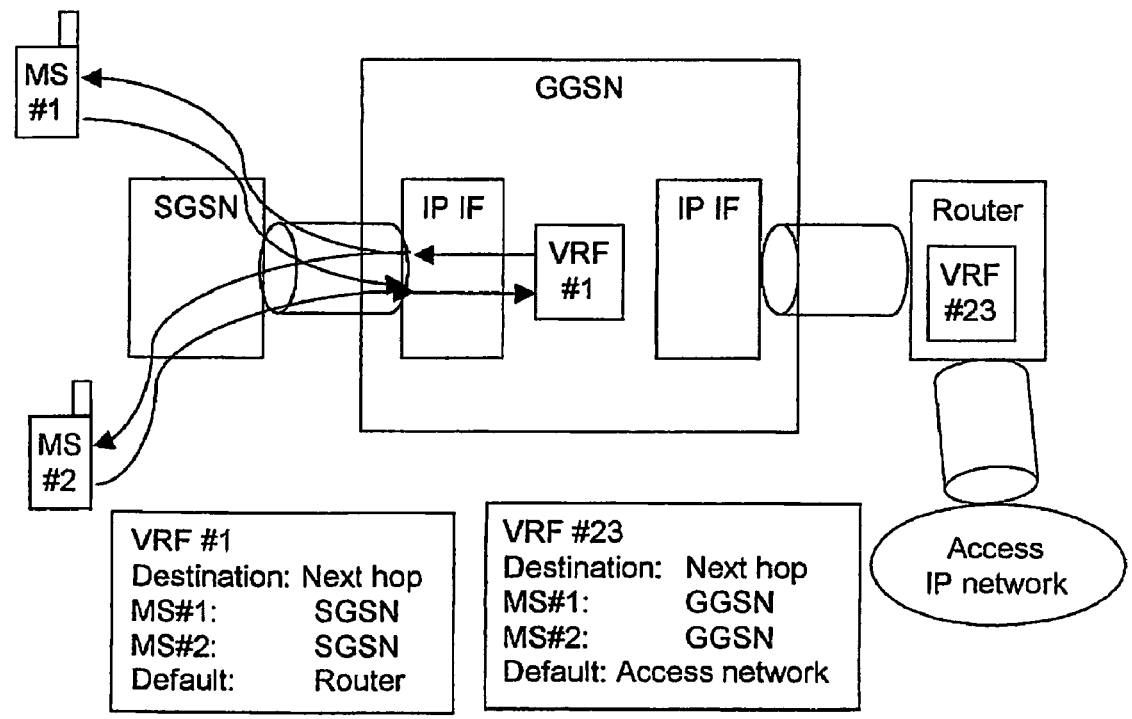
Fig. 2 - Prior art

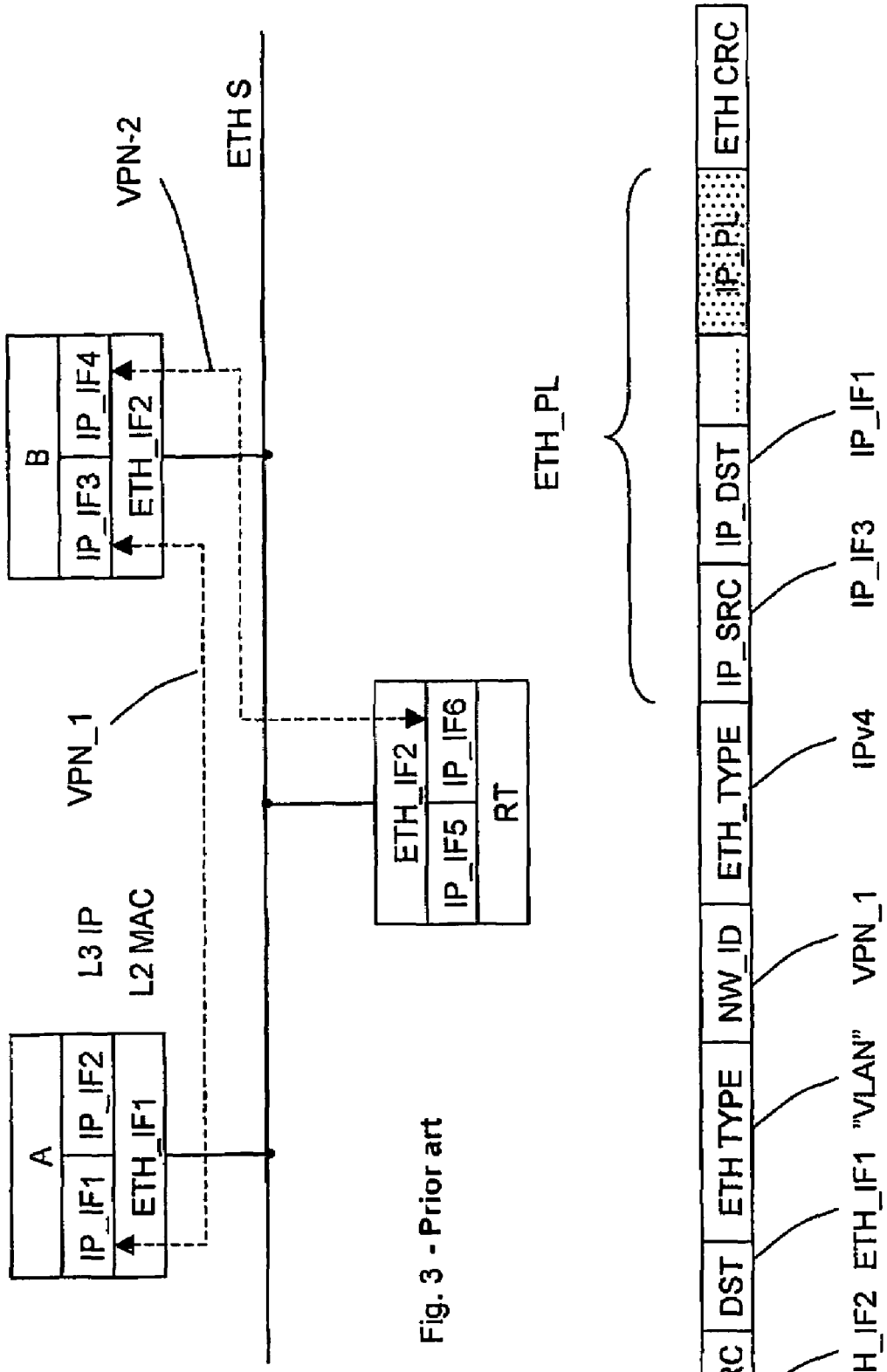
Fig. 3 - Prior art
Fig. 4 - Prior art

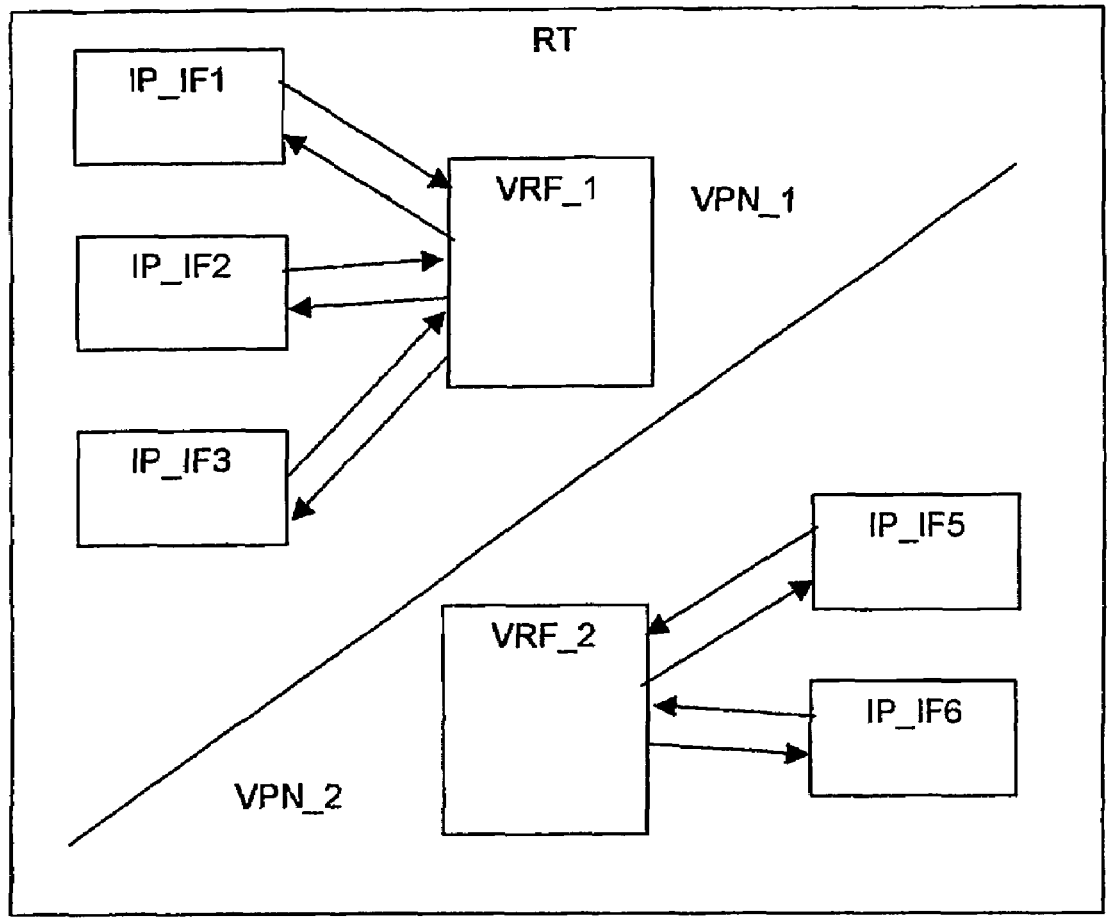
Fig. 5 - Prior art

ROUTING IN VIRTUAL PRIVATE NETWORK

FIELD OF THE INVENTION

The invention relates to the technical field of TCP/IP routing and forwarding and relates especially to concepts within virtual private networks (VPNs).

The main applications for the invention are IP routers with high VPN scalability demands, such as the GGSN (Gateway GPRS Switching Node) in GPRS (General Packet Radio Service) networks. The invention relates to WPP 5.0 (Wireless Packet Platform).

BACKGROUND OF THE INVENTION

A Virtual Private Network (VPN) is an extension to a network that is remotely administrated. This network is carried over the local network via tunneling, either in protocols that either can be IP based or not IP based (for example ATM). When extending these networks into mobile packet data networks, a single node must handle a large number of VPNs. This implicates that the management and configuration of all these extensions to the VPNs has to be managed by the operator managing the mobile packet network. In for example GPRS (General Packet Radio Service), the GGSN (Gateway GPRS Switching Node) connects the mobile network to the remotely administrated network. FIG. 1 depicts a schematic overview of such a GPRS network with the GGSN.

FIG. 2 depicts an example with traffic between two mobile stations. This example shows that the administrator of the GGSN has to manage the packet filtering rules that protects the mobile stations from each other. The traffic between mobile stations cannot be monitored from a remotely administrated network.

One known solution is based on an implementation of packet filtering doing packet forwarding. By defining a packet filter that forwards all traffic from one interface or tunnel to another interface or tunnel, the routing information in the forwarding table will not be considered and the traffic can be forced to a remote network.

Another known WPP solution to the problem is to directly map traffic from one interface/tunnel into another interface or tunnel, without making a forwarding decision based on the destination IP address. This known solution is called APN (Access Point Name) Routing.

The disadvantage with the above solutions is poor redundancy, since the packet filters (or mapping table) are not dynamically updated and the interface or tunnel that the packets are forwarded to might be unavailable due to link or network problems.

FIG. 3 shows two nodes A and B and a router RT being physically connected to an Ethernet segment ETH S. Two virtual private networks VPN_1 and VPN_2 are implemented over the common Ethernet segment ETH_S. Node A comprises a first and a second IP interface IP_IF1 and IP_IF2. The IP interfaces IP_IF1 and IP_IF2 at the IP layer 3 are mapped to the given unique layer 2 MAC (Media Access Control) Ethernet address ETH_IF1 by means of the ARP (automatic Request Protocol) protocol.

Likewise interfaces—IP_IF3—and IP_IF4 are mapped to Ethernet interface ETH_IF2 of node B. IP interfaces IP_IF5 and IP_IF6 is mapped to ETH_IF2 on router RT.

IP_IF1 of node A forms a first virtual private network VPN_1 with IP_IF3 of node B. IP_IF4 of node B forms a second virtual private network VPN_2 with IP_IF6 of router RT. IP Packets may be communicated between the respective IP interfaces over the respective VPN's. To the various IP interfaces of each respective VPN it appears that the Ethernet segment is exclusive.

FIG. 4 shows an exemplary IP packet delivered from IP interface IP_IF3 to IP_IF1 on VPN_1 for the network shown in FIG. 3. The IP packet is encapsulated in an Ether packet with source address SRC=ETH_IF2 and destination address DST=ETH_IF1. It has an Ethernet type identification of type "VLAN"—Virtual Local Area Network—and carries a corresponding network identifier VPN_1 and a second Ethernet type identifier IPv4 pertaining to the version of the IP protocol being used. In the Ethernet payload ETH_PL there is provided the IP source (IP SRC) and destination addresses (IP DST) mentioned above and the IP payload. The packet is ended by an Ethernet cyclical redundancy check value ETH CRC.

In FIG. 5 an exemplary prior art network has been shown comprising a router RT providing a first virtual private network VPN_1 via forwarding table VRF_1 providing interconnectivity for IP interfaces IP_IF1, IP_IF2 and IP_IF3. The router moreover provides a second virtual private network VPN_2 via forwarding table VRF_2 providing interconnectivity for IP interfaces IP_IF5 and IP_IF6.

SUMMARY OF THE INVENTION

It is first object of the invention to set forth a router that allows for selective routing depending on traffic direction.

It is a secondary object to set forth a router that allows for communication between various private networks.

It is a third object to set forth a system allowing for forced traffic over a specific interface.

It is a fourth object to set forth a system in which packet control is deferred to a corporate network.

According to a further aspect of the invention, in order to increase the security in a VPN network it is desired that all traffic (i.e. IP packets) from mobile terminals always shall go via the home network. This gives the VPN administrator the possibility to specify the packet filtering rules to be applied both for traffic destined to a mobile terminal, as well as for traffic coming from a mobile terminal. This is independent of whether the packets are destined to the same mobile network extension as the packet originated from, or not. Without forcing traffic to the home network, the packet filtering rules would have to be configured by the operator of the mobile extension to the VPN network instead of the administrator of the home network.

Further advantages of the invention will appear from the following detailed description of preferred embodiments of the invention.

BRIEF DESCRIPTION OF THE DRAWINGS

FIG. 1 shows an overall diagram of the GPRS network architecture,

FIG. 2 shows a known method of performing routing in a GPRS network,

FIG. 3 shows a known way of implementing virtual private networks (VPN) on an Ethernet segment, FIG. 4 shows a packet used in FIG. 3, FIG. 5 shows a prior art router providing two VPN networks.

DETAILED DESCRIPTION OF PREFERRED EMBODIMENTS OF THE INVENTION

According to the invention, multiple VRF's (VPN Routing/Forwarding instances) are used per IP interface. An IP interface can for example be a bi-directional IP-in-IP tunnel or an IP-over-Ethernet interface. The forwarding table that is used to route traffic from a given interface may not route traffic to the same IP interface. This distinction makes it possible to let traffic in one direction belong to one VRF and traffic in the other direction belong to another VRF. Furthermore, if the interface has multiple peers, each peer end-point can belong to different VRF's.

Figure 6:
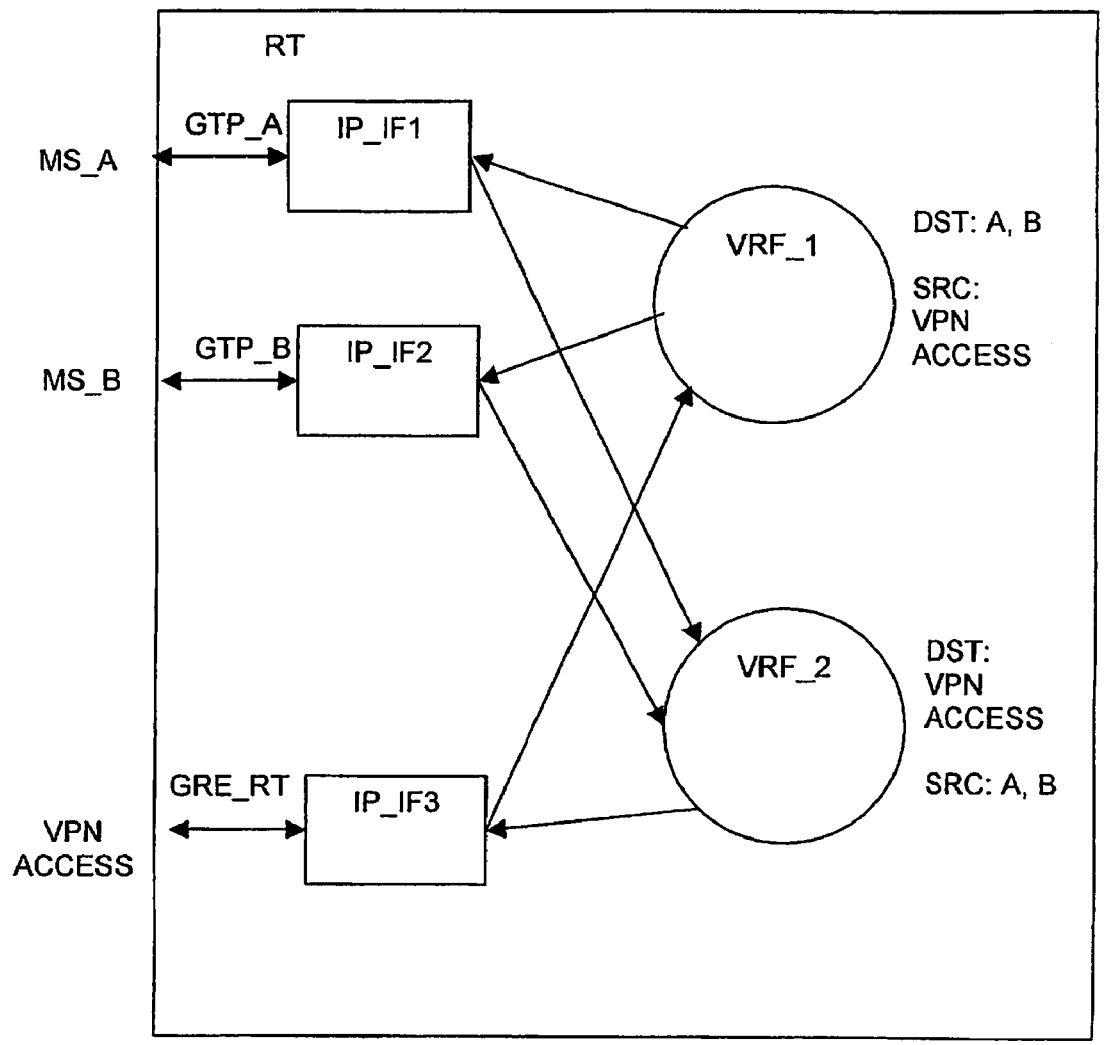
FIG. 6 shows a first embodiment of a router according to the invention.

FIG. 6 shows a first embodiment of the invention, comprising a router RT comprising router tables VRF_1 and VRF_2 and IP interfaces IP_IF1, providing access to a GTP tunnel GTP_A, which connects to a first mobile station MS_A and IP interface IP_IF2, providing access to a second GTP tunnel GTP_B that connects to mobile station MS_B. The router moreover comprises a third IP interface IP_IF3 that connects to GRE tunnel GRE_RT providing connection to a VPN access net, such as a corporate Intranet.

As indicated by the arrows, forwarding table VRF_1 routes packets form IP interface IP_IF3 to IP interface IP_IF1 and IP_IF2 depending on which mobile station the given packet is intended for. Forwarding table VRF_2 route packets from source MS_A and MS_B to IP interface IP_IF3 and further to the VPN access net. Thereby, the traffic between mobile stations MS_A and MS_B can be controlled by the VPN access net.

Figure 7:
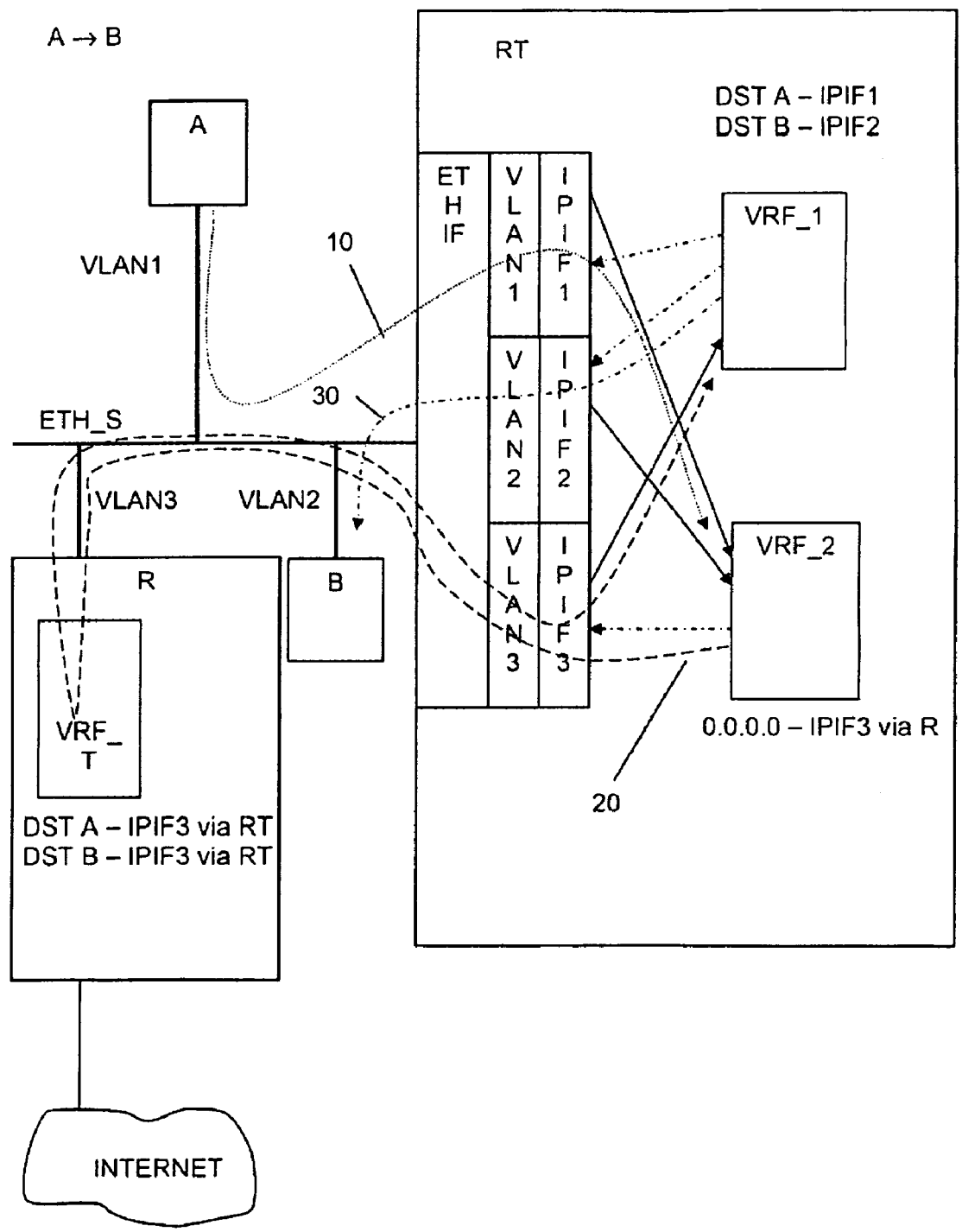
FIG. 7 shows a second embodiment of a VPN network according the invention including a packet flow form a node A to a node B.

FIG. 7 shows a further embodiment of the invention in which a first router RT connects to an Ethernet segment ETH_S via IP interfaces IP_IF1, IP_IF2 and IP_IF3, forming respective virtual private networks VLAN1, VLAN2 and VLAN3 and an Ether router interface ETH_IF. The first router comprises a first forwarding table VRF_1 and forwarding table—VRF_2—.

A node A connects to the router via virtual local area network VLAN1 and a node B connects to the router via virtual local network VLAN2 over the common Ethernet segment ETH_S.

A second router R comprising forwarding table VRF_T connects VLAN3 over the common Ethernet segment ETH_S. The second router also connects to the Internet.

Forwarding tables VRF_1 defines for destination A a next hop of IP interface IP_IF1 and for destination node B IP interface IF2. Forwarding tables VRF_2 defines interface IP_IF3 as default next hop address. Forwarding table—VRF_T—defines IP interface IPIF_3 for both destinations A and B.

A packet sent from mobile station A to B is forwarded along arrow 10 through IP interface IPIF_1 to forwarding table VRF_2 and further on to IP interface IPIF_3 to router R, arrow 20, and back again to IP interface IPIF_3 and to forwarding table VRF_1. Forwarding table VRF_1 defines IP interface IPIF_2 as next hop for destination B, and consequently the packet is transmitted to node B along arrow 30.

The router is being configured such that in the event that a mobile station on one interface IP_IF1 is communicating with a mobile station on interface IP_IF2, the traffic may be routed via the second interface IP_IF3.

Figure 8:
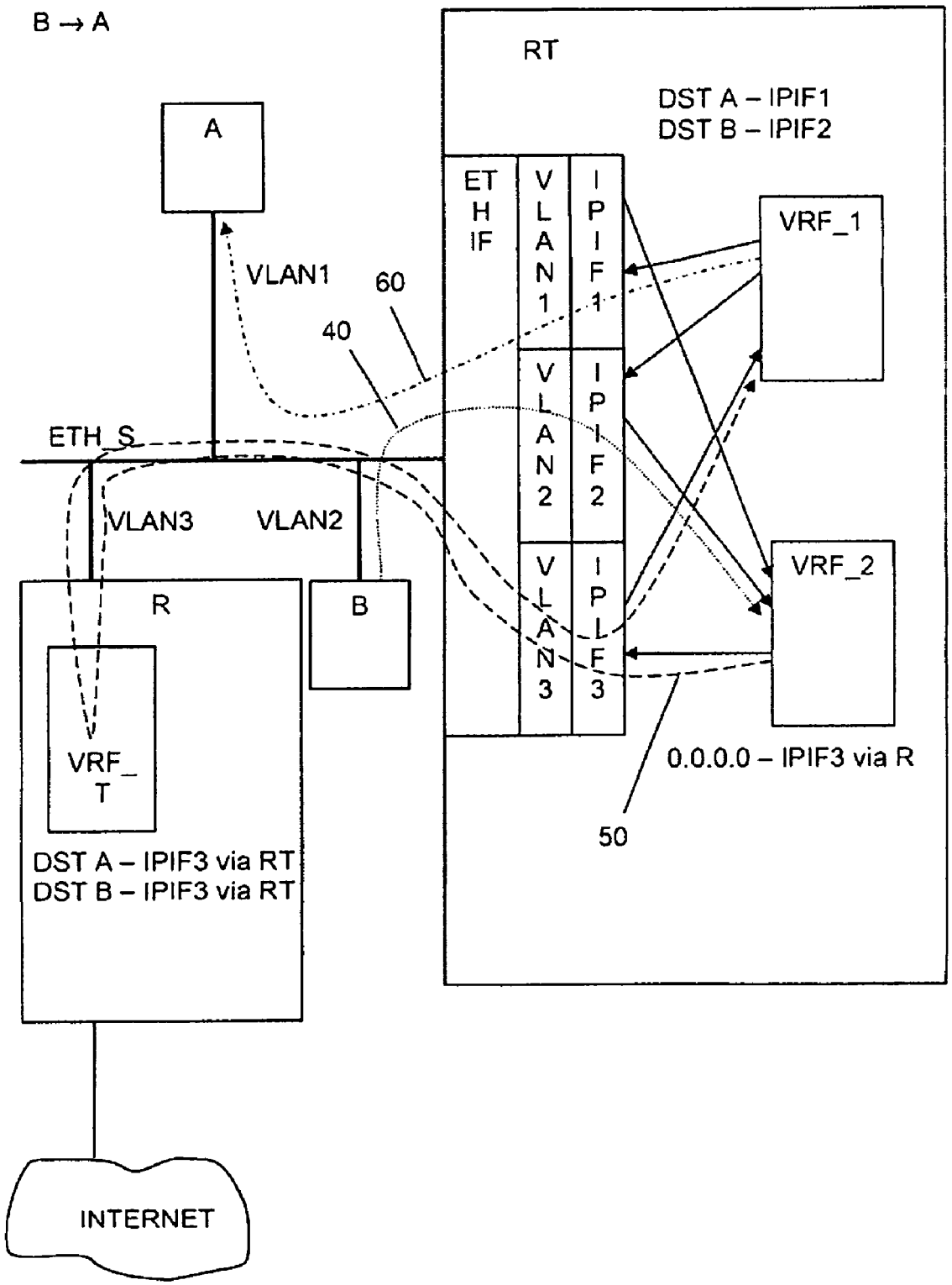
FIG. 8 shows the same VPN network as in FIG. 7, including a packet flow form a node B to a node A.

In FIG. 8 the opposite path of transmitting a packet has been shown as indicated by arrows 40, 50 and 60.

It should be understood that the many other technologies that Ethernet could be used on the data link layer.

The forwarding table for a VRF can only have routes to interfaces that in the outbound direction belong to the VRF. The question of which VRF to use for the forwarding decision is selected from the VRF configuration for the inbound direction of the receiving interface. The definition of interfaces in both outbound and inbound direction can be extended to also consider the source and destination peers (can for instance be identified via link level addresses) to allow different VRFs for different remote peers (for example routers) on a multi-access link.

The distinction between inbound and outbound direction provides the possibility that an interface can be used by multiple VRFs in the outbound direction. That is, several VRFs can use the same outbound link; e.g., both VRF_1 and VRF_2 could use the same outbound link, for instance IPIF_3. This feature is very useful together with broadcast and multicast based services. One example is that it makes it possible to have a separate multicast VPN that gives multicast services that several other VPNs can use. Traffic from the multicast network can be forwarded into another VPN where the end-users of the service are connected. The benefit of doing this is that the common services between the networks can use one common network architecture that enables more efficient use of the transport links. This is how multicast networks are used to give better performance, but multicast services are currently not possible to share between VPNs and this invention provides a solution to the problem.

The main problem in WPP solved by the invention is that it allows GGSN nodes to defer packet filtering to a remote network to decrease the need of packet filtering configurations for the manager of the GGSN node. The present invention provides a scalable routing solution towards the external networks.

Figure 9:
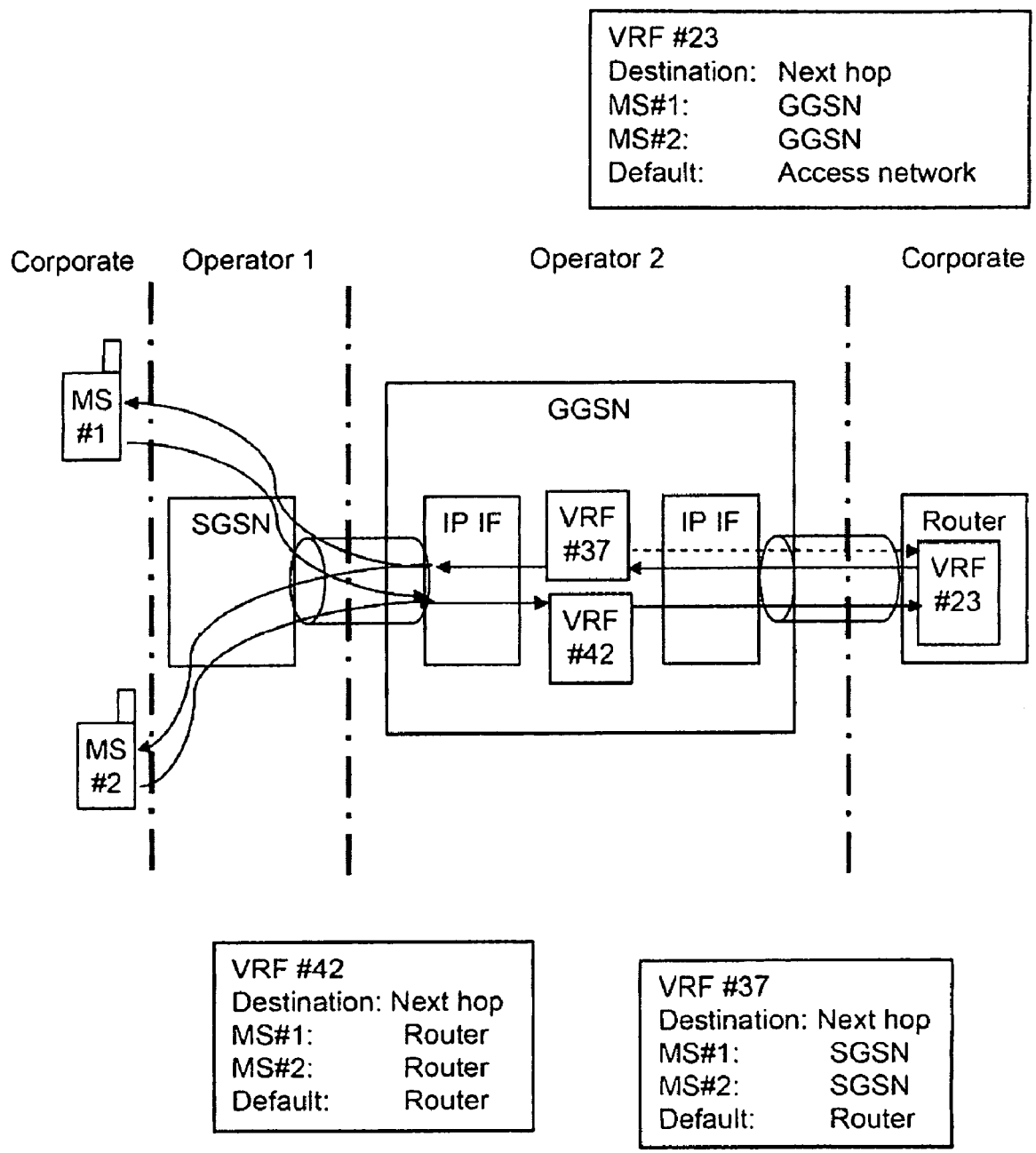
FIG. 9 shows an application of the present invention in a GPRS network.
Figure 10:
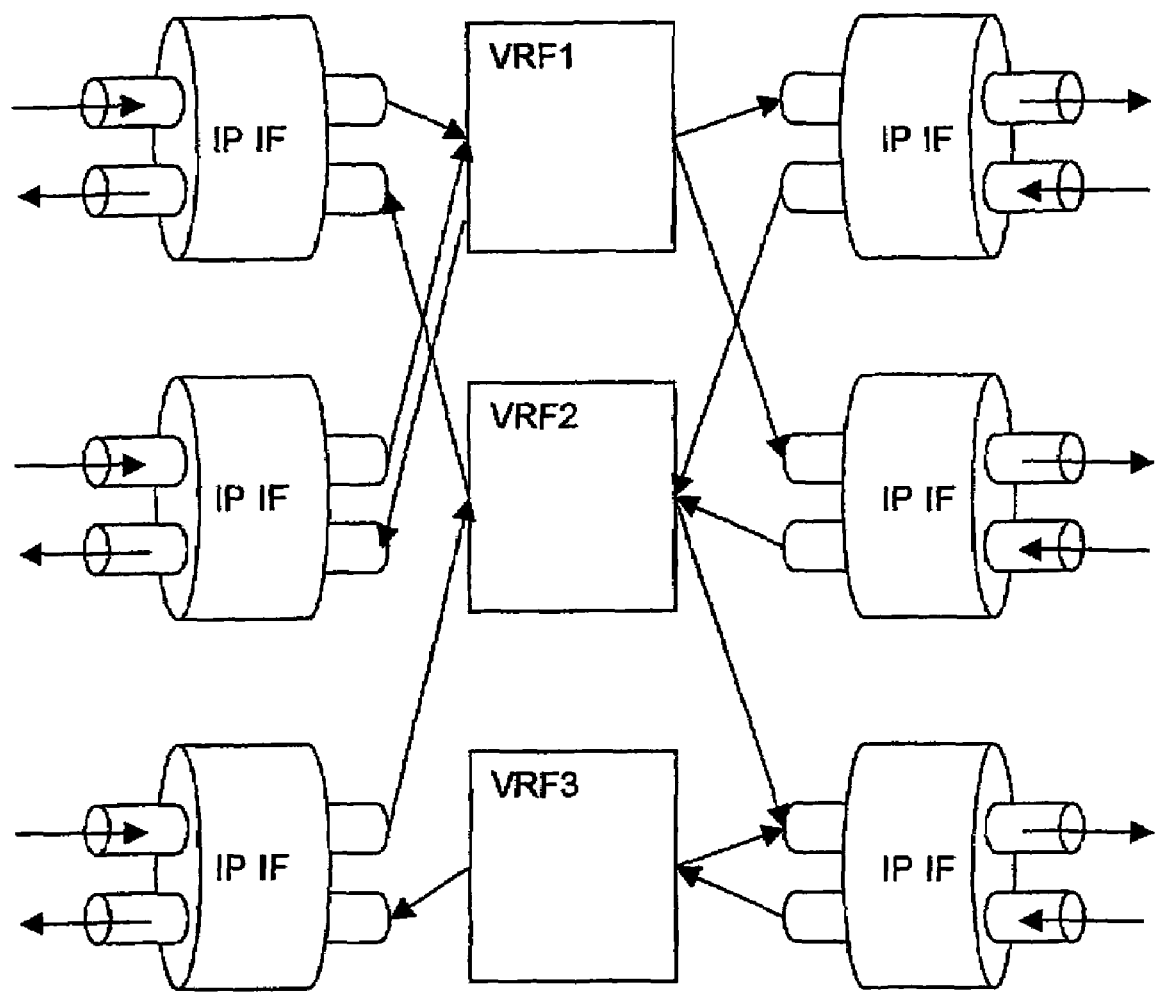
FIG. 10 shows a scenario in which three forwarding tables, VRF1, VRF2 and VRF3, and 6 IP interfaces, IP IF's, are used. It is shown that both VRF2 and VRF3 use the same outbound link, namely the bottom right IP interface.

FIG. 9 depicts a third preferred embodiment of the invention in which traffic between two mobile stations MS#1 and MS#2, belonging to the same corporate network as the router holding VRF#23, according to the invention. VRF#37 and VRF#42 are used in the GGSN and VRF#23 is used in the router. The invention is used in the GGSN. For traffic from the mobile stations VRF#42 is used. For traffic from the router VRF#37 is used. VRF#42 has the Router as next hop for all the routes in the forwarding table. This means that all traffic from the mobiles is sent to the router. VRF#37 has the SGSN (Serving GPRS Support Node) as next hop for the two mobile stations. This means traffic from the Router destined to the Mobile Stations are sent to the SGSN. Traffic from the router which is not destined to the Mobile Stations are sent back to the router as the forwarding table for VRF#37 has a default route pointing out the router as next hop for all traffic which is not destined to the mobile stations. The router only has one VRF (VRF#23) for all its interfaces. The router is a normal router. A packet sent from one of the mobile station destined to the other mobile station is sent to the GGSN via the SSGN. The GGSN performs a forwarding lookup (using the forwarding table of VRF#42) and then routes the packet to the router. The router performs a forwarding lookup and routes the traffic back to the GGSN as the forwarding table for VRF#23 points out the GGSN as next hop for the mobile stations. The GGSN once again makes a forwarding lookup (using the forwarding table of VRF#37) and then routes the packet to the SGSN. The SGSN delivers the packet to the receiving mobile station. It should be noted that, a third mobile station not belonging to the corporate network would not use the tunnel shown in FIG. 9. Another parallel set of tunnels and forwarding tables would be set up.

FIG. 9 shows an example of how the Network Management responsibilities can be divided between different administrators. In this figure, the mobile stations MS#1, MS#2 and the router holding VRF#23 belong to the same corporate network, designated "Corporate", and all administration for this network is handled by the corporate network administrator. By way of example, a first operator, Operator 1, controls the SGSN node and a second operator, Operator 2, controls the GGSN node. There is a clear separation between GPRS network administration and the administration of the corporate network.

This example also shows, when applicable, the separation between the SGSN and GGSN operators. It is a strong business case for an operator to provide the corporate networks with a service, making it possible for the corporate network administrator to configure the packet filters for the mobile stations and monitor all traffic to and from mobile stations. It is therefore a strong business case for a GGSN vendor to provide an operator with equipment implementing this invention. It should be noted that forwarding tables VRF#37 and VRF#42 are controlled by Operator 2 in accordance with whatever agreement exists between Corporate and Operator 2.

The ability to route packets to the VRF in the opposite direction for an interface have been implemented. This is necessary to implement, if ICMP messages shall be supported. The VRF for the opposite direction is easy to find, since ICMP messages are generated for an outbound interface and the packet can then be handled as if it had arrived on that interface. The forwarding table in a VRF can be updated by a routing daemon.

Routing daemons receive their routing information from different interfaces and can treat these interfaces as belonging to different routing areas. By separating the inbound and outbound direction of these interfaces, the routing protocol can be configured to filter which information to send to different interfaces. Thereby, the directions of the routing updates can be separated; if the routing protocol used for route announcements supports unidirectional links.

The invention can for example be used for IPv4 and IPv6. Both IPv4 and IPv6 interfaces can be bi-directional or unidirectional. The present invention provides the possibility for a router (or host) to treat bi-directional interfaces as two unidirectional interfaces at the same time as the peer routers (or hosts) view the interface on the router (or host) as a bi-directional interface. In other words, the surrounding network environment is not affected by the use of the invention, if it is not deliberately used in such a way.

The invention has a high potential to solve many current and future problems in different areas of IP routing, since it is a fundamental change of how interfaces are treated in IP routing and forwarding environments.

Abbreviations
ATM Asynchronous Transfer Mode
APN In the GPRS backbone, an Access Point Name (APN) is a reference to a GGSN. To support inter-PLMN roaming, the internal GPRS DNS functionality is used to translate the APN into the IP address of the GGSN.
GGSN Gateway GPRS Support Node
GPRS General Packet Radio Service
GSM Global System for Mobile communication
ICMP Internet Control Message Protocol (RFC 792)
IP Internet Protocol (RFC 791)
IP IF IP interface
SGSN Serving GPRS Support Node
TCP Transmission Control Protocol (RFC 793)
TCP/IP Suite of protocols, including IP, TCP UDP, ICMP and other protocols
UDP User Datagram Protocol (RFC 768)
UMTS Universal Mobile Telephone System
VPN Virtual Private Network.
VRF VPN Routing/Forwarding instance
WPP Wireless Packet Platform

The invention claimed is:

1. A router, comprising:
    at least two IP interfaces, wherein each IP interface is associated with a respective virtual local area network;
    at least two forwarding tables, wherein a first of said forwarding tables is used for routing traffic towards a first of said IP interfaces, and a second of said forwarding tables is used for routing traffic from the first IP interface, wherein the two forwarding tables together allow bi-directional traffic from the same first IP interface;
    wherein the first IP interface is coupled to a first tunnel providing bi-directional connectivity to mobile stations and a second IP interface of said IP interfaces is coupled to a second tunnel providing bi-directional connectivity to a corporate network; and,
    wherein a third interface provides bi-directional connectivity to mobile stations, and wherein the router routes the traffic via the second IP interface in the event that a mobile station on the first IP interface is communicating with a mobile station on the third interface.

2. The router according to claim 1, wherein packets received on one IP interface and relating to one given virtual local area network are forwarded to another IP interface relating to another virtual local area network.

3. The router according to claim 1, wherein the packets from one mobile station to another mobile station are forwarded to a remote router, that makes a policy decision.

4. A network, comprising:
    a router, said router comprising:
    at least two IP interfaces, wherein each IP interface is associated with a respective virtual local area network; and
    at least two forwarding tables, wherein:
    a first table of the two forwarding tables is used for routing traffic towards a first IP interface and a second table of the two forwarding tables is used for routing traffic from the first IP interface, wherein the two tables together allow bi-directional traffic from the same first IP interface;
    packets received on the first IP interface and relating to a first virtual local area network are forwarded to a second IP interface relating to a second virtual local area network;
    the first IP interface is coupled to a first tunnel providing bi-directional connectivity to mobile stations and the second IP interface is coupled to a tunnel providing bi-directional connectivity to a corporate network; and,
    wherein a third interface provides bi-directional connectivity to mobile stations, and wherein the router routes the traffic via the second IP interface in the event that a mobile station on the first IP interface is communicating with a mobile station on the third interface.

5. The network according to claim 4, further comprising a remote router configured such that packets from one mobile station to another mobile station are forwarded to said remote router, the remote router selectively taking a policy decision.

6. The network according to claim 5, wherein the remote router comprises a firewall.

7. The network according to claim 4, wherein the router comprises a GGSN node.

* * * * *

UNITED STATES PATENT AND TRADEMARK OFFICE
CERTIFICATE OF CORRECTION

| | | |
|---|---|---|
| PATENT NO. | : 7,596,110 B2 | Page 1 of 1 |
| APPLICATION NO. | : 10/503740 | |
| DATED | : September 29, 2009 | |
| INVENTOR(S) | : Backman et al. | |

It is certified that error appears in the above-identified patent and that said Letters Patent is hereby corrected as shown below:

In Column 1, Line 51, delete "ETH S." and insert -- ETH_S. --, therefor.

In Column 2, Line 9, delete "(IP SRC)" and insert -- (IP_SRC) --, therefor.

In Column 2, Lines 9-10, delete "(IP DST)" and insert -- (IP_DST) --, therefor.

In Column 3, Line 50, delete "IF2." and insert -- IP_IF2. --, therefor.

In Column 3, Line 52, delete "IPIF_3" and insert -- IP_IF3 --, therefor.

In Column 3, Line 54, delete "IPIF_1" and insert -- IP_IF1 --, therefor.

In Column 3, Line 55, delete "IPIF_3" and insert -- IP_IF3 --, therefor.

In Column 3, Line 56, delete "IPIF_3" and insert -- IP_IF3 --, therefor.

In Column 3, Line 58, delete "IPIF_2" and insert -- IP_IF2 --, therefor.

In Column 4, Line 15, delete "IPIF_3." and insert -- IP_IF3. --, therefor.

In Column 4, Line 51, delete "SSGN." and insert -- SGSN. --, therefor.

Signed and Sealed this

Ninth Day of March, 2010

David J. Kappos
*Director of the United States Patent and Trademark Office*